June 4, 1929. F. L. COMBS 1,715,899
ELECTRIC WATER HEATER
Filed Aug. 1, 1928 2 Sheets-Sheet 1
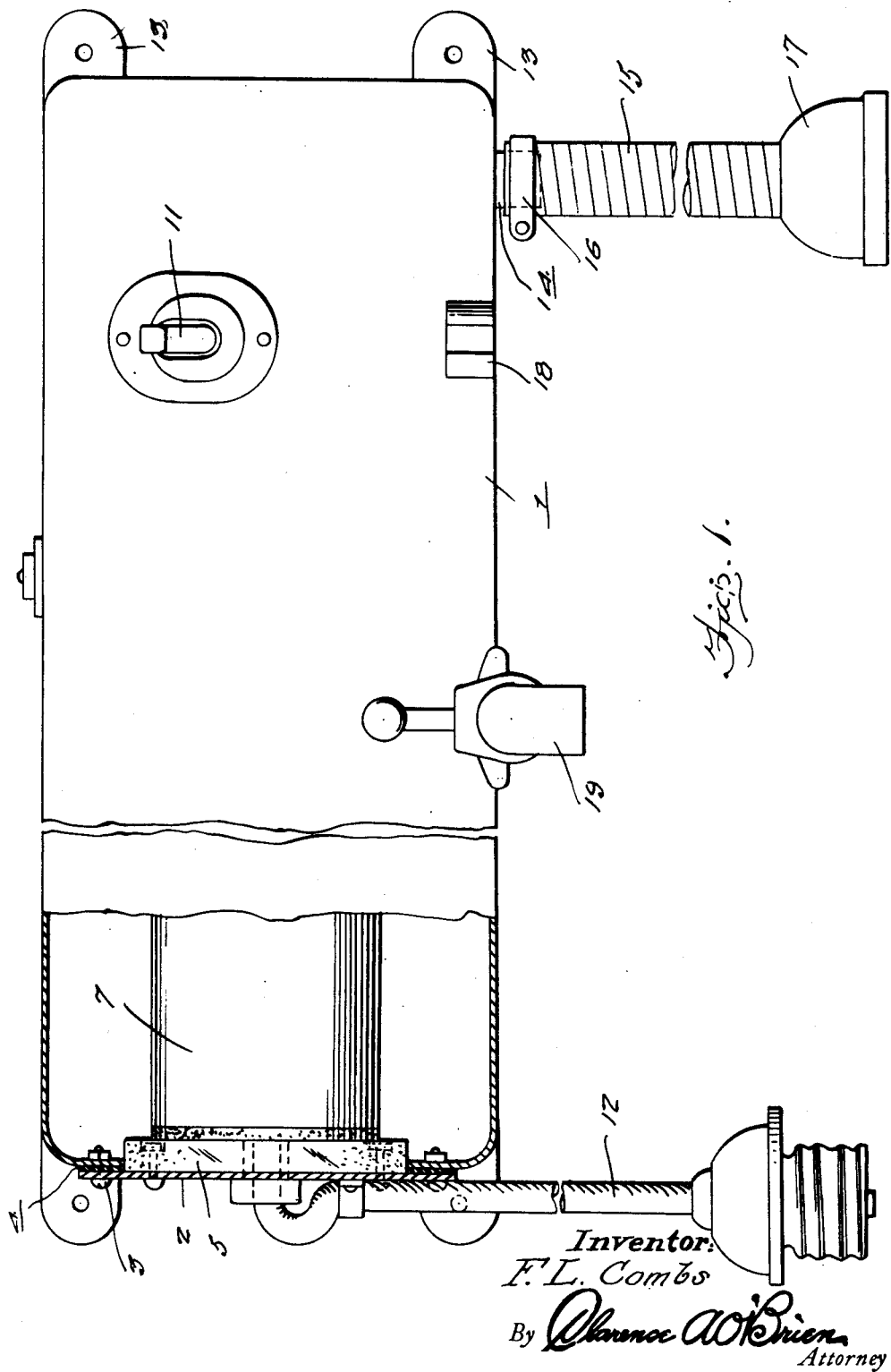

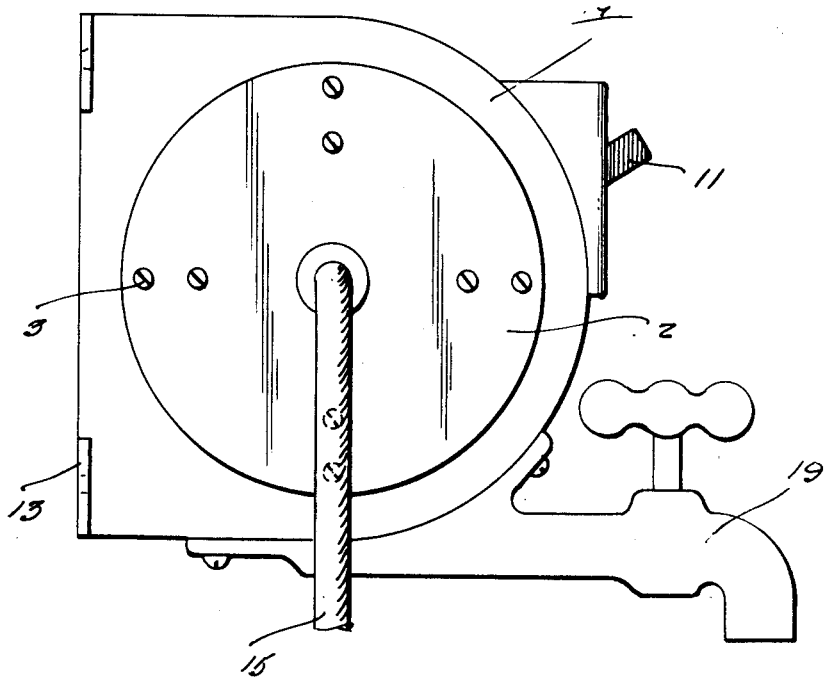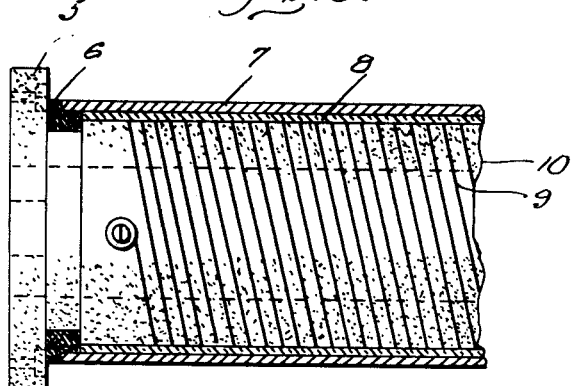

Patented June 4, 1929.

1,715,899

UNITED STATES PATENT OFFICE.

FRAYNE LYLE COMBS, OF WAPAKONETA, OHIO.

ELECTRIC WATER HEATER.

Application filed August 1, 1928. Serial No. 296,719.

This invention relates to improvements in the art of electrical heaters, and the same has more particular reference to a heater in which small quantities of water may be quickly heated.

The device is especially useful on trains or in the staterooms of boats, obviously eliminating the necessity of maintaining a large quantity of water hot, which incurs considerable more expense than in the individual use of the device embodied in this invention.

The device is also especially useful for heating water for shaving, filling hot water bottles, and for like emergencies to be quickly met.

A further object resides in the provision of a container which may be secured to a wall, immediately above a wash basin or the like, and in which an electrical heating unit is arranged, the container being provided with a connection attachable to the faucet of a wash basin, whereby water may flow into the container and therein be heated, and to be subsequently drawn through a faucet or similar outlet associated with the container.

After reading the following specification and claim, other objects and advantages will readily become apparent.

In the drawing:

Figure 1 represents a side elevation in partial section and fragmentized, the same disclosing the means whereby the heating element may be removed from the container.

Figure 2 is an end elevation of the device, and

Figure 3 is a longitudinal sectional view, through the heating element casing, the same being shown fragmentarily.

Referring to the drawings, wherein like numerals designate like parts, an elongated container 1 is closed, at one end and provided with an opening in its opposite end. A plate 2 is adapted to be secured to the end of the container and over said opening by suitable means 3, while the resilient gasket 4 may be interposed between the plate 2 and the end of the container 1 for insuring a leak-proof joint. A plate 5 of insulating material is secured to the inner side of the plate 2 and is adapted to project through the opening in the end of the container. An annulus 6 of insulating material is secured to the insulating plate 5 and the outer end portion thereof is adapted to engage within one end of an elongated casing 7, which casing is preferably of high heat conductive material. The opposite end of the casing 7 is preferably closed and a tube 8 of a suitable insulating material, such as mica, is disposed snugly within the casing 7. A heating element 9 is convoluted about an insulating core 10 in the manner shown in Figure 3. The casing 7 with the heating element 9 arranged therein is adapted to extend for substantially the full length of the container and in spaced relation to the walls thereof.

A suitable switch structure 11 is mounted on the exterior of the casing and has the proper connection to the heating element 9, whereby current supplied through the conductor 12 may be switched on or off as desired. Ear members 13 extend from the container 1 and are formed with openings through which suitable securing elements may be inserted for securing the container to a support, such as a wall or the like.

A nipple 14 depending from the container 1 and having communication therewith is adapted for engagement within one end of a flexible pipe 15 which is secured to the nipple by a clamp band 16. The bore through the nipple 14 is of such size as to permit the flow of water therethrough as fast as the heater will heat the same.

The free end of the flexible pipe 15 is provided with a structure 17 whereby the same may be attached to the faucet of the fixture over which the container is supported. A spring clip 18 secured to the container is adapted for supporting the flexible pipe 15 when the latter is not being used. A faucet 19 is secured to the container 1 and has communication with the space therein between the casing 7 and the wall of the container 1, whereby hot water may be drawn from the container for sundry purposes. The communication space in faucet 19 is of such a size that the water can be drawn from the heater as fast as it is heated. A blow-off safety valve is located at the top of the casing, whereby an excessive steam pressure within the casing may be relieved.

Although the structure embodied in this invention has been specifically set forth in the foregoing specification, it is to be understood that certain changes may be made in the shape, size, and materials of this device without departing from the spirit of the invention or the scope of the appended claim.

Having described the invention, what is claimed as new is:

In an electrical water heater comprising an elongated container having an opening in one end thereof, a plate secured over said opening, an insulating plate secured to the inner side of the said plate, an elongated tubular body connected at one end to the insulating plate and being adapted for longitudinal disposition within the container, a core of insulating material for disposition within the tubular body, a heating element arranged on said core, a sleeve of insulating material for interposition between the coil and the said tubular body, and a water inlet and outlet for the container.

In testimony whereof I affix my signature.

FRAYNE LYLE COMBS.